United States Patent [19]

Hummerich et al.

[11] 4,387,212
[45] Jun. 7, 1983

[54] PREPARATION OF AMINOPLAST RESINS

[75] Inventors: Rainer Hummerich; Herbert Hahn, both of Ludwigshafen; Wolfram Weiss, Mutterstadt; Güenther Immel, Weinheim; Hans-Joachim Krause, Ludwigshafen; Karl-Clemens Peters, Bad Durkheim, all of Fed. Rep. of Germany

[73] Assignee: BASF Aktiengesellschaft, Fed. Rep. of Germany

[21] Appl. No.: 420,318

[22] Filed: Sep. 20, 1982

[30] Foreign Application Priority Data

Sep. 28, 1981 [DE] Fed. Rep. of Germany ....... 3138548

[51] Int. Cl.³ .................... C08G 4/00; C08G 12/00
[52] U.S. Cl. .................................. 528/232; 528/254
[58] Field of Search ............................. 528/232, 254

[56] References Cited

U.S. PATENT DOCUMENTS

| | | | |
|---|---|---|---|
| 3,450,660 | 6/1969 | Sekmakas | 528/254 |
| 3,464,946 | 9/1969 | Downing | 528/254 |
| 3,519,627 | 7/1970 | Coats et al. | 528/254 |

FOREIGN PATENT DOCUMENTS

| | | |
|---|---|---|
| 1218456 | 6/1966 | Fed. Rep. of Germany . |
| 1957301 | 5/1971 | Fed. Rep. of Germany . |
| 1793512 | 2/1972 | Fed. Rep. of Germany . |
| 2105783 | 9/1972 | Fed. Rep. of Germany . |
| 2507461 | 9/1976 | Fed. Rep. of Germany . |
| 2737984 | 8/1977 | Fed. Rep. of Germany . |
| 3025352 | 2/1982 | Fed. Rep. of Germany . |

Primary Examiner—Lucille M. Phynes

Attorney, Agent, or Firm—Keil & Witherspoon

[57] ABSTRACT

A process for the preparation of etherified or non-etherified aminoplast resins, wherein an aminotriazine of the general formula (I)

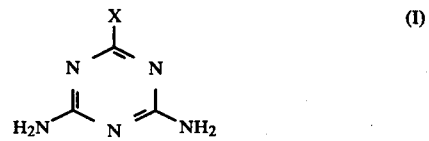

where X is hydrogen, alkyl, phenyl, alkylphenyl or —NH₂, is reacted with a β-hydroxyaldehyde of the general formula (II)

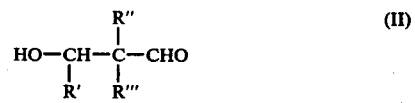

where R', R" and R'" are identical or different and each is hydrogen or alkyl, or R" and R'", together with the α-carbon atom, are a cyclopentane or cyclohexane ring, and R" and/or R'" can be hydroxyalkyl and R" can be phenyl, the reaction being carried out in the presence of not less than one alcohol and an acid catalyst for the preparation of etherified aminoplast resins and in the presence or absence of an acid catalyst for the preparation of non-etherified aminoplast resins. The aminoplast resins prepared according to the invention can be used as surface-coatings raw materials.

6 Claims, No Drawings

PREPARATION OF AMINOPLAST RESINS

The present invention relates to a process for the preparation of aminoplast resins which are based on reaction products of aminotriazines and aldehydes and can be used as surface-coatings raw materials.

It is known that pure reaction products can be obtained from melamine or aminotriazines and aldehydes. In practice, substantially only reaction products of melamine and formaldehyde, which can be used, inter alia, as an aqueoous resin solution (impregnating/sizing resins) or as a powder in the preparation of compression molding materials, have become established. Other applications have hitherto been unsuccessful because of the solution properties of the products. Aldehydes other than formaldehyde have hitherto been used less frequently, and only if the reactions were carried out in the presence of alcohols, alkoxyalkyl groups being formed.

German Published Application DAS No. 1,218,456 discloses a process in which bis-butylol-melamine ethers are formed by reacting melamine with butyraldehyde and a lower aliphatic alcohol of not more than six carbon atoms with addition of relatively large amounts of water. The disadvantages of this process are the extremely long reaction times and the necessary continuous mechanical regeneration of the surface of the melamine particle by working in a ball mill.

German Laid-Open Applications DOS No. 2,105,783 and DOS No. 2,737,984 disclose that reaction of an aminotriazine, an aldehyde of not less than 2 carbon atoms and a lower alcohol gives a high yield of bis- or tris-alkylolaminotriazine ether in one stage. The resulting tris-ethers are said to be "readily soluble in conventional organic solvents, such as alcohols, esters and chlorinated hydrocarbons". As will be shown with the aid of comparative examples, however, this process gives exclusively products which have only a limited solubility in ethylene glycol (1 part in about 10 parts of solvent), but are sparingly soluble in all other solvents for surface coatings. Since, moreover, they are incompatible with other binders (alkyd or acrylate resins), these condensates cannot be used as surface-coatings raw materials.

Alkoxyalkylaminotriazines, eg. hexamethoxymethylmelamine and tetramethoxymethylbenzoguanamine, have also been known for a long time. The former is obtained by reacting 1 mole of melamine with 6 moles of formaldehyde and then completely etherifying the product with an excess of methanol to give the hexamethoxymethyl derivative. Compounds of this type are used as surface-coating resins and can be crosslinked with a large number of hydroxyl-, carboxyl- or amide-containing polymers.

German Patent Application No. P 30 25 352.2 proposes reaction products of alkoxyaminotriazines and β-hydroxyaldehydes. There are otherwise no references in the literature to the preparation and use of etherified β-hydroxyaminotriazine derivatives obtained from aminotriazines, β-hydroxyaldehydes and alcohols.

It is an object of the present invention to discover a process for the preparation of etherified or non-etherified aminoplast resins based on reaction products of aminotriazines and aldehydes, which can be carried out in a particularly advantageous manner and leads to products which, especially in the case of etherified reaction products, do not have the above disadvantages of the conventional products and can therefore advantageously be used as surface coatings raw materials.

We have found that this object is achieved by a process for the preparation of etherified or non-etherified aminoplast resins which are based on reaction products of aminotriazines and aldehydes and can be used as surface-coatings raw materials, wherein an aminotriazine of the general formula (I)

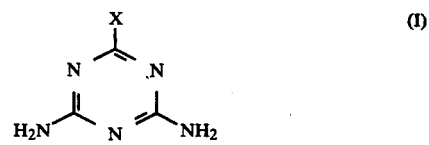

where X is hydrogen, alkyl of 1 to 15 carbon atoms, phenyl, alkylphenyl, where alkyl is of 1 to 4 carbon atoms, or —NH$_2$, is reacted with from 0.1 to 3 moles, per mole of acidic hydrogen on the aminotriazine, of a β-hydroxyaldehyde of the general formula (II)

where R', R" and R'" are identical or different and each is hydrogen or alkyl of 1 to 5 carbon atoms, or R" and R'", together with the α-carbon atom, are a cyclopentane or cyclohexane ring, and R" and/or R'" can also be hydroxyalkyl of 1 to 4 carbon atoms and R" can be phenyl, at from 60° to 200° C. and, if necessary, at least some of the water thereby formed is removed, the reaction being carried out in the presence of not less than one alcohol and an acid catalyst for the preparation of etherified aminoplast resins and in the presence or absence of an acid catalyst for the preparation of non-etherified aminoplast resins.

From 0.1 to 30 moles, per mole of aminotriazine, of a monoalcohol and/or polyalcohol are used as the alcohol for the preparation of etherified aminoplast resins.

The aminoplast resins prepared according to the invention can be used, in particular, as surface-coatings raw materials.

The components which build up the products and the preparation process according to the invention are described in detail below.

Examples of suitable aminotriazines of the general formula (I)

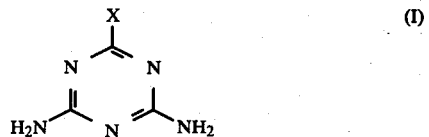

where X is hydrogen, alkyl of 1 to 15 carbon atoms, phenyl, alkylphenyl, where alkyl is of 1 to 4 carbon atoms, or —NH$_2$, are 2,4,6-triamino-1,3,5-triazine (=melamine), guanamine, benzoguanamine and acetoguanamine. Melamine and benzoguanamine are preferred.

Examples of suitable β-hydroxyaldehydes of the formula (II)

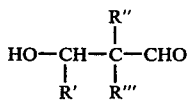

(II)

where R', R" and R'" are identical or different and each is hydrogen or alkyl of 1 to 5 carbon atoms, or R" and R'", together with the α-carbon atom, are a cyclopentane or cyclohexane ring, and R" and/or R'" can also be hydroxyalkyl of 1 to 4 carbon atoms and R'" can be phenyl, are aldol adducts which can be obtained in accordance with the following equation:

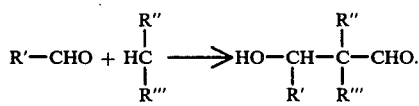

Examples of aldehydes which can be used for the preparation of these aldol adducts are formaldehyde, acetaldehyde, propanal, n-butanal, n-pentanal, n-hexanal, n-heptanal, 2-methylpropanal, 2-methylbutanal, 2-methylpentanal, 2-ethylbutanal, 2-ethylhexanal, 3-methylbutanal, cyclopentyl-carboxaldehyde and cyclohexyl-carboxaldehyde.

Examples of β-hydroxyaldehydes which can be obtained in this manner are 3-hydroxybutanal, 3-hydroxy-2-methyl-propanal, 3-hydroxy-2-methyl-butanal, 3-hydroxy-2-pentanal, 3-hydroxy-2-methyl-hexanal, 3-hydroxy-2-methylheptanal, 3-hydroxy-2-ethyl-pentanal and 3-hydroxy-2-ethyl-hexanal, and, in particular, reaction products of iso- and n-alkanals or cycloalkyl-carboxaldehydes with formaldehyde, eg. 2,2-dimethyl-3-hydroxy-propanal, 2-methyl-2-ethyl-3-hydroxy-propanal, 2-methyl-2-propyl-3-hydroxy-propanal, 2-ethyl-2-butyl-3-hydroxypropanal, 2,2-dimethylolpropanal, 2,2-dimethylol-butanal, 2,2-dimethylol-pentanal, 2,2-dimethylol-3-hydroxy-propanal, 1-methylolcyclopentyl-carboxaldehyde and 1-methylol-cyclohexyl-carboxaldehyde. German Published Application DAS No. 1,793,512 and German Laid-Open Applications DOS No. 1,957,301 and DOS No. 2,507,461, inter alia, disclose processes for the preparation of these products. 2,2-Dimethyl-3-hydroxypropanal (hydroxypivalaldehyde, R'=H, R"=R'"=CH$_3$) is preferred.

According to the invention, from 0.1 to 3 moles, preferably from 0.5 to 2 moles, of the hydroxyaldehyde are used per mole of acidic hydrogen in the aminotriazine.

For the preparation of non-etherified aminoplast resins, the reaction can be carried out without the addition of a catalyst and/or solvent or in the presence of an acid catalyst, such as an inorganic or organic acid, eg. HCl, H$_2$SO$_4$, H$_3$PO$_4$, HNO$_3$, p-toluenesulfonic acid, oxalic acid or maleic acid, or maleic anhydride or an acid ion exchanger, and/or in the presence of a solvent, such as an aliphatic or cycloaliphatic hydrocarbon, eg. an n-alkane or cyclohexane, or an aromatic hydrocarbon, eg. toluene or xylene, in general at from 60° to 200° C., preferably at from 80° to 150° C., under atmospheric or reduced pressure, preferably under from 600 to 60 mbar.

Suitable alcohols for the preparation, according to the invention, of etherified aminoplast resins are monoalcohols and/or polyalcohols, for example monoalcohols of 1 to 6 carbon atoms, eg. methanol, ethanol n-propanol, isopropanol, n-butanol, isobutanol, hexanol and cyclohexanol, and polyhydric alcohols, eg. ethylene glycol, propylene glycol, butanediol and glycerol, and mixtures of the above alcohols. Methanol and butanol are preferred.

From 0.1 to 30 moles, preferably from 3 to 15 moles, of alcohol are used per mole of aminotriazine. Excess alcohol can be removed by distillation during or after removal of the water formed in the reaction.

Etherified aminoplast resins are prepared according to the invention in the presence of, in general, from 0.01 to 10% by weight, preferably from 0.05 to 5% by weight, based on the aminotriazine, of an acid catalyst as described above. The etherified aminoplast resins are prepared within the same temperature and pressure ranges as the non-etherified products.

The reaction is preferably carried out in an excess of alcohol at from 60° to 130° C.

Etherified aminoplast resins which can very readily be diluted with organic solvents, such as ethanol, ethyl acetate, glycol acetate and xylene, making them particularly advantageous for use as surface-coatings raw materials, can be prepared in this manner. Another advantage of the products is that they are very compatible with other binders, eg. alkyd and acrylate resins (for example in a ratio of 1:1 solid/solid).

The aminoplast resins according to the invention can be used, for example, as binders by themselves or in combination with other conventional surface-coating binders.

In the examples, parts and percentages are by weight, unless indicated otherwise.

The β-hydroxyaldehydes to be used can be prepared as disclosed in German Laid-Open Applications DOS No. 1,957,301 and DOS No. 2,507,461 and German Published Application DAS No. 1,793,512. In situ preparation of the β-hydroxyaldehydes as disclosed in German Patent Application No. P 30 25 352.2 is particularly advantageous.

734.7 parts of isobutyraldehyde are mixed with 750 parts of 40% strength formaldehyde, with stirring. The mixture is heated to about 40° C. and 25.7 parts of 40% strength trimethylamine are run in. The temperature is allowed to rise to 45° C., and cooling is then applied so that the temperature rises only slowly to 60° C. A further 8.6 parts of 40% strength trimethylamine are then added. The reaction is then controlled so that the temperature rises only slowly to from 75° to 80° C. but the solution does not boil. The mixture is then heated at from 90° to 92° C. for a short time and immediately cooled again to from 65° to 70° C. The reaction solution is then concentrated at an internal temperature of 65° C. under a water pump vacuum until the first drops of hydroxypivalaldehyde pass over, which occurs at a bottom temperature of 90° C. and a boiling point of 75° C. under a complete water pump vacuum.

The β-hydroxyaldehyde thus obtained is then reacted with the aminotriazine, the alcohol and, where relevant, the catalyst, either in the same reaction vessel or in another one.

A. PREPARATION, ACCORDING TO THE INVENTION, OF NON-ETHERIFIED AMINOPLAST RESINS

EXAMPLES 1–17

(a) The aminotriazine and the β-hydroxyaldehyde are heated at T (°C.) for Z hours under reduced pressure.

Water and unreacted β-hydroxyaldehyde are distilled off, and a water-clear resin remains.

(b) The aminotriazine and the β-hydroxyaldehyde are heated at T (°C.) for Z hours under reduced pressure in the presence of a catalyst. Water and unreacted β-hydroxyaldehyde are distilled off, and a water-clear resin remains.

(c) The aminotriazine and the β-hydroxyaldehyde are heated at T (°C.) for Z hours in a solvent and in the presence of a catalyst. Water and unreacted β-hydroxyaldehyde are removed from the system and a water-clear solution of the resin in the particular solvent used remains.

|  | Aminotriazine | | Hydroxy-aldehyde | | Temp. | Reaction time | Catalyst | | Softening point | Solubility properties (ease of dilution) | | | |
|---|---|---|---|---|---|---|---|---|---|---|---|---|---|
| Number | Type | Parts | Type | Parts | T in °C. | Z in hours | Type | Parts | (DIN) | Alcohol | Toluene | White spirit | Ethyl acetate |
| 1 | A | 126 | a | 637.5 | 120 | 3.5 | — | — | 76.5° C. | 1:20 | 1:1 | — | 1:20 |
| 2 | A | 126 | a | 633 | 120 | 3 | — | — | 79.5° C. | 1:20 | 1:1 | — | 1:20 |
| 3 | A | 126 | a | 637.5 | 90 140 | 4 5 | — | — | 103.7° C. | 1:20 | 1:5 | — | 1:20 |
| 4 | A | 126 | a | 663 | 90 140 | 4 4 | — | — | 200° C. | 1:20 | 1:2 | — | 1:20 |
| 5 | A | 126 | a | 637.5 | 90 | 3.4 | p-toluene-sulfonic acid | 5 | 68.4° C. | 1:20 | — | — | 1:20 |
| 6 | A | 126 | a | 714 | 90 | 2.25 | p-toluene-sulfonic acid | 5 | 69.1° C. | 1:20 | 1:3 | — | 1:20 |
| 7 | A | 126 | a | 816 | 90 | 2.33 | p-toluene-sulfonic acid | 2.5 | 41.3° C. | 1:20 | 1:6 | — | 1:20 |
| 8 | A | 126 | a | 739.5 | 90 | 2.33 | p-toluene-sulfonic acid | 2.5 | 54.3° C. | 1:20 | 1:3 | — | 1:20 |
| 9 | B | 187 | a | 408 | 120 | 1.58 | — | — | 60° C. | 1:20 | 1:20 | — | 1:20 |
| 10 | B | 187 | a | 612 | 120 | 1.58 | — | — | 44° C. | 1:20 | 1:20 | — | 1:20 |
| 11 | A | 94.5 | b | 543.75 | 120 | 2 | p-toluene-sulfonic acid | 3.75 | 73.7° C. | 1:20 | 1:20 | — | 1:20 |
| 12 | A | 84.2 | c | 609 | 120 | 8 | — | 3.75 | 48.4° C. | 1:20 | 1:20 | 1:1 | 1:20 |
| 13 | A | 84.2 | c | 609 | 120 | 8 | p-toluene-sulfonic acid | 3.34 | 200° C. | 1:20 | 1:20 | 1:2.5 | 1:20 |
| 14 | B | 187 | b | 464 | 120 | 1.5 | — | — | 68° C. | 1:20 | 1:20 | — | 1:20 |
| 15 | B | 187 | b | 580 | 120 | 1.5 | — | — | 48° C. | 1:20 | 1:20 | — | 1:20 |
| 16 | A | 94.5 | b | 543.75 | 120 | 2 | — | — | 49° C. | 1:20 | 1:20 | — | 1:20 |
| 17 | A | 84.2 | b | 543.75 | 120 | 2 | p-toluene-sulfonic acid | 3.34 | 58.1° C. | 1:20 | 1:20 | — | 1:20 |

Triazine:
A ≙ melamine
B ≙ benzoguanamine
Aldehydes:
a ≙ β-hydroxypivalaldehyde
b ≙ 2-hydroxymethyl-2-methyl-butanal
c ≙ 2-hydroxymethyl-2-methyl-pentanal

B. PREPARATION, ACCORDING TO THE INVENTION, OF ETHERIFIED AMINOPLAST RESINS

EXAMPLE 18

306 parts (3 moles) of hydroxypivalaldehyde, 126 parts (1 mole) of melamine, 988 parts (31 moles) of methanol and 2.5 parts of p-toluenesulfonic acid are refluxed for 5 hours, with stirring. When the mixture has cooled, unreacted melamine is filtered off, the resin solution is neutralized with about 7 parts of 25% strength sodium hydroxide solution and excess alcohol and aldehyde are distilled off at 120° C. under an absolute pressure of 100 mbar. The highly viscous reaction product is brought to a viscosity of 2,000 mPas/30° C. with about 60 parts of ethanol. 385 parts of a 60% strength resin solution are obtained.

| Solubilities: | ethanol | 1:00 |
|---|---|---|
|  | butanol | 1:00 |
|  | ethyl acetate | 1:00 |
|  | ethylene glycol | 1:00 |
|  | turpentine oil | 1:28 |
|  | xylene | 1:16 |

COMPARATIVE EXAMPLE 1
(ACCORDING TO GERMAN LAID-OPEN APPLICATION DOS NO. 2,105,783/EXAMPLE 1)

252 parts (2 moles) of melaine, 432 parts (6 moles) of isobutyraldehyde, 988 parts (31 moles) of methanol and 5 parts of p-toluenesulfonic acid are refluxed for 5 hours, with stirring. When the mixture has cooled, it is filtered at room temperature and the residue is dried at 60° C. in a vacuum drying cabinet. 544 parts of a white powder of melting point 229° C. are obtained.

| Solubilities: | ethanol | |  |
|---|---|---|---|
|  | butanol | } | 1:0.5 |
|  | ethyl acetate | | |
|  | ethylene glycol | | 1:10 |
|  | turpentine oil | } | 1:0.5 |

EXAMPLE 19

1,070 parts (10.5 moles) of hydroxypivalaldehyde, 1,400 parts (18.9 moles) of n-butanol, 106 parts (0.84 mole) of melamine and 2.5 parts of p-toluenesulfonic acid are reacted for 3 hours as in Example 18. Dilution of the mixture with 60 parts of ethanol gives 930 parts of a 75% strength resin solution.

| Solubilities: | ethanol | 1:00 |
|---|---|---|
| | butanol | 1:00 |
| | ethyl acetate | 1:0.5 |
| | ethylene glycol | 1:00 |
| | turpentine oil | 1:1.5 |
| | xylene | 1:0.5 |

COMPARATIVE EXAMPLE 2

(ACCORDING TO GERMAN LAID-OPEN APPLICATION DOS NO. 2,737,984/TABLE 1)

126 parts of melamine, 900 parts (12.5 moles) of n-butyraldehyde, 1,460 parts (20 moles) of n-butanol and 3 parts of p-toluenesulfonic acid are refluxed for 2 hours and the mixture is worked up as described above. 150 parts of a white powder of melting point 183° C. are obtained.

| Solubilities: | ethanol | |
|---|---|---|
| | butanol | <1:0.5 |
| | ethyl acetate | |
| | ethylene glycol | about 1:10 |
| | turpentine oil | |
| | xylene | <1:0.5 |

EXAMPLE 20

189 parts (1.5 moles) of melamine, 612 parts (6 moles) of hydroxypivalaldehyde, 750 parts (10 moles) of n-butanol and 7.5 parts of p-toluenesulfonic acid are refluxed for 5 hours and the mixture is worked up as described in Example 18. Dilution with 400 parts of n-butanol gives 1,070 parts of a 55% strength solution.

| Solubilities: | ethanol | 1:00 |
|---|---|---|
| | butanol | 1:00 |
| | ethyl acetate | 1:00 |
| | ethylene glycol | 1:00 |
| | turpentine oil | 1:20 |
| | xylene | 1:12 |

COMPARATIVE EXAMPLE 3

(ACCORDING TO GERMAN LAID-OPEN APPLICATION DOS NO. 2,105,783/EXAMPLE 4)

252 parts (2 moles) of melamine, 576 parts (8 moles) of i-butyraldehyde, 986 parts (13.5 moles) of n-butanol and 5 parts of sulfamic acid are reacted for 5 hours as in Comparative Example 1 and the mixture is worked up. Yield: 540 parts of product of melting point 229° C.

| Solubilities: | ethanol | |
|---|---|---|
| | butanol | <1:0.5 |
| | ethyl acetate | |
| | ethylene glycol | 1:8 |
| | turpentine oil | |
| | xylene | <1:0.5 |

EXAMPLE 21

281 parts (1.5 moles) of benzoguanamine, 612 parts (6 moles) of hydroxypivalaldehyde, 864 parts (27 moles) of methanol and 3.8 parts of p-toluenesulfonic acid are refluxed for 2 hours and the mixture is worked up as described above. Addition of 160 parts of ethanol gives 1,100 parts of a 70% strength solution.

| Solubilities: | ethanol | 1:00 |
|---|---|---|
| | butanol | 1:00 |
| | ethyl acetate | 1:00 |
| | ethylene glycol | 1:00 |
| | turpentine oil | 1:4 |
| | xylene | 1:2 |

We claim:

1. A process for the preparation of etherified or non-etherified aminoplast resins which are based on reaction products of aminotriazines and aldehydes and can be used as surface-coatings raw materials, wherein an aminotriazine of the general formula (I)

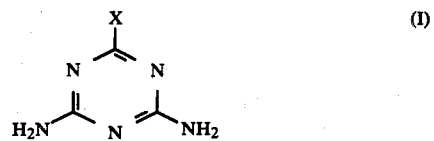

where X is hydrogen, alkyl of 1 to 15 carbon atoms, phenyl, alkylphenyl, where alkyl is of 1 to 4 carbon atoms, or —NH$_2$, is reacted with from 0.1 to 3 moles, per mole of acidic hydrogen on the aminotriazine, of a β-hydroxyaldehyde of the general formula (II)

where R', R" and R''' are identical or different and each is hydrogen or alkyl of 1 to 5 carbon atoms, or R" and R''', together with the α-carbon atom, are a cyclopentane or cyclohexane ring, and R" and/or R''' can also be hydroxyalkyl of 1 to 4 carbon atoms and R" can be phenyl, at from 60° to 200° C. and some or all of the water thereby formed is removed, the reaction being carried out in the presence of not less than one alcohol and an acid catalyst for the preparation of etherified aminoplast resins and in the presence or absence of an acid catalyst for the preparation of non-etherified aminoplast resins.

2. A process as claimed in claim 1, wherein from 0.1 to 30 moles of a monoalcohol or polyalcohol per mole of aminotriazine are used as the alcohol for the preparation of etherified aminoplast resins.

3. A process as claimed in claim 1, wherein from 3 to 15 moles of a monoalcohol, a polyalcohol or a mixture thereof per mole of aminotriazine are used as the alcohol for the preparation of etherified aminoplast resins.

4. A process as claimed in claim 1, wherein from 0.01 to 10% by weight, preferably from 0.05 to 5% by weight, based on the aminotriazine, of an acid catalyst is used for the preparation of etherified aminoplast resins.

5. An aminoplast resin based on reaction products of aminotriazines and aldehydes and prepared by the process as claimed in claim 1.

6. An aminoplast resin based on reaction products of aminotriazines and aldehydes and prepared by the process as claimed in claim 2.

* * * * *